US010060627B2

(12) United States Patent
Massot et al.

(10) Patent No.: US 10,060,627 B2
(45) Date of Patent: Aug. 28, 2018

(54) FLAME-HOLDER DEVICE

(71) Applicant: SAFRAN AIRCRAFT ENGINES, Paris (FR)

(72) Inventors: Max Massot, Barsac (FR); Charles Leleu, Saint Medard en Jalles (FR); Brice Le Pannerer, Dammarie les Lys (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/549,701

(22) PCT Filed: Feb. 3, 2016

(86) PCT No.: PCT/FR2016/050225
§ 371 (c)(1),
(2) Date: Aug. 9, 2017

(87) PCT Pub. No.: WO2016/128646
PCT Pub. Date: Aug. 18, 2016

(65) Prior Publication Data
US 2018/0031240 A1     Feb. 1, 2018

(30) Foreign Application Priority Data

Feb. 10, 2015 (FR) ...................... 15 00266

(51) Int. Cl.
*F23R 3/18* (2006.01)
*F23R 3/60* (2006.01)
(Continued)

(52) U.S. Cl.
CPC ............... *F23R 3/18* (2013.01); *F02K 3/105* (2013.01); *F23R 3/60* (2013.01); *F02K 3/10* (2013.01); *F05D 2300/133* (2013.01)

(58) Field of Classification Search
CPC ...... F23R 3/18; F23R 3/60; F02K 3/10; F02K 3/105; F05D 2300/133
See application file for complete search history.

(56) References Cited

U.S. PATENT DOCUMENTS 5,127,224 A     7/1992 Barcza et al.
7,168,253 B1 *  1/2007 Blanchard ................. F02K 3/10
                                                    60/765

(Continued)

FOREIGN PATENT DOCUMENTS

FR     2 894 326 A1     6/2007
FR     2 935 464 A1     3/2010
FR     2 950 416 A1     3/2011

OTHER PUBLICATIONS

International Search Report as issued in International Patent Application No. PCT/FR2016/050225, dated May 2, 2016.

(Continued)

*Primary Examiner* — Carlos A Rivera
*Assistant Examiner* — Thuyhang Nguyen
(74) *Attorney, Agent, or Firm* — Pillsbury Winthrop Shaw Pittman LLP

(57) ABSTRACT

A flame-holder device for a reheat channel of a turbojet, the device including an arm in the form of a trough defining a cavity and a heat shield fastened in the cavity of the arm. The flame-holder device further includes a fastener plate including a first leg integrally formed with the fastener plate and a second leg removably mounted on the plate, the arm being fastened to the first and second legs via fastener members.

19 Claims, 3 Drawing Sheets

(51) Int. Cl.
*F02K 3/105* (2006.01)
*F02K 3/10* (2006.01)

(56) References Cited

U.S. PATENT DOCUMENTS

| | | | |
|---|---|---|---|
| 7,886,542 B2 * | 2/2011 | Blanchard | F23R 3/283 60/761 |
| 2011/0067407 A1 * | 3/2011 | Berdou | F02K 3/10 60/765 |
| 2011/0138773 A1 * | 6/2011 | Hernandez | F02K 3/10 60/226.1 |

OTHER PUBLICATIONS

International Preliminary Report on Patentability and the Written Opinion of the International Searching Authority as issued in International Patent Application No. PCT/FR2016/050225, dated Aug. 15, 2017.

* cited by examiner

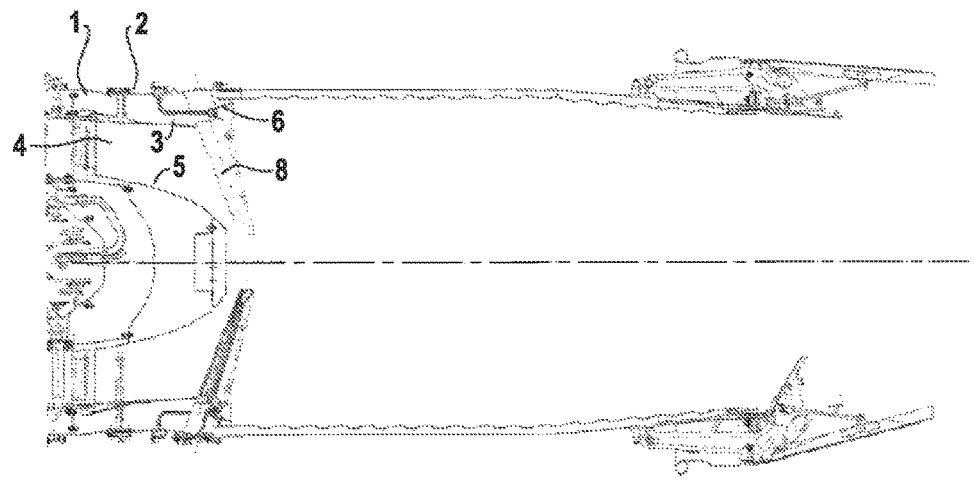
FIG.1
PRIOR ART
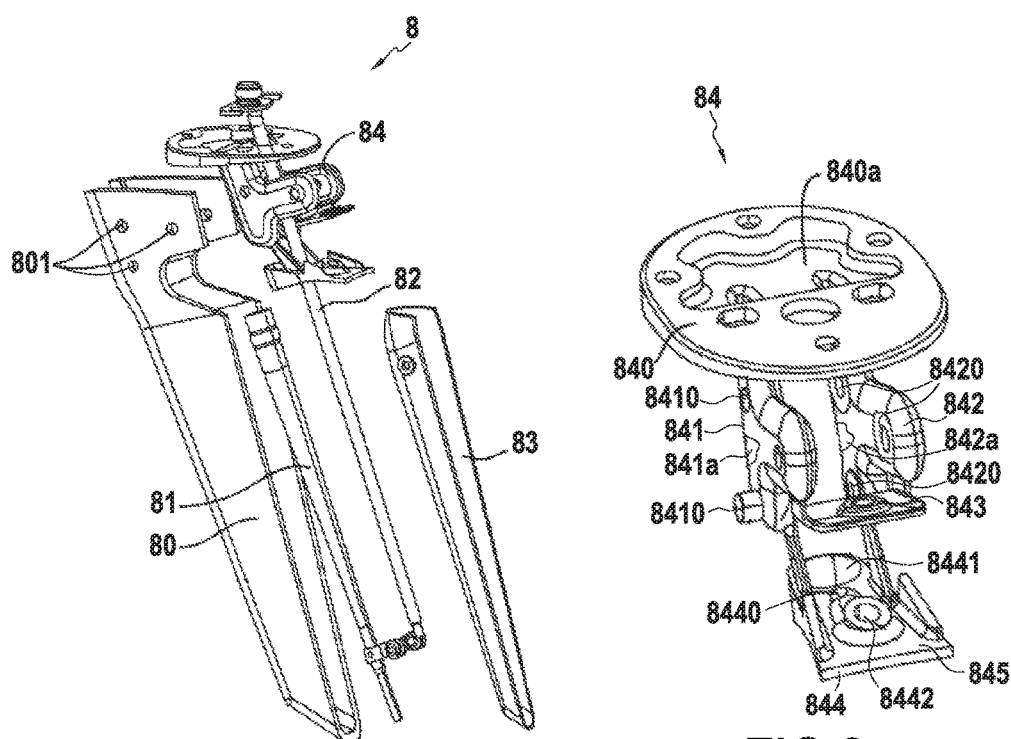
FIG.2
PRIOR ART
FIG.3
PRIOR ART

FLAME-HOLDER DEVICE

CROSS REFERENCE TO RELATED APPLICATIONS

This application is the U.S. National Stage of PCT/FR2016/050225 filed Feb. 3, 2016, which in turn claims priority to French Application No. 1500266, filed Feb. 10, 2015. The contents of both applications are incorporated herein by reference in their entirety.

BACKGROUND OF THE INVENTION

The present invention relates to the field of bypass turbojets, and more particularly to afterburner devices of such jets.

In a bypass turbojet with an afterburner, having an afterbody of the type shown in FIG. 1, the air stream is initially sucked in by a low pressure compressor. A first portion of the air stream at the outlet from the low pressure compressor feeds a high pressure compressor, while a second portion passes into a first passage 1 defined between an external annular casing 2 and a first internal annular casing 3. The air stream compressed by the high pressure compressor feeds a combustion chamber, which in turn feeds combustion gas to a high pressure turbine followed by a low pressure turbine, which has an outlet passing via a second passage 4 defined between the first internal annular casing 3 (or confluence sheet) and a second internal annular casing 5 (or exhaust cone). The combustion gas feeding the second passage 4 is at high temperature and is referred to as a "primary" stream (or hot stream). The air feeding the first passage 1 presents a temperature that is substantially lower than the temperature of the primary stream and is referred to as a "secondary" stream (or cold stream).

Downstream from the outlet of the turbine it is possible to increase thrust by injecting an additional quantity of fuel into the primary and secondary streams, with the fuel burning within an afterburner channel. Such a system mainly comprises a set of devices 8, referred to as "flame-holders", and a burner ring 6. The burner ring 6 is carried by the flame-holder devices 8 and is located in the secondary stream, in the vicinity of the confluence sheet 3.

A portion of the injection takes place via the burner ring 6 that serves to inject a portion of the fuel in uniform manner and to stabilize the flame.

The structure of a flame-holder device 8 is shown in FIGS. 2 and 3. The flame-holder device 8, which is described in Document US 2011/0138773, comprises an arm 80 in the form of a channel-section trough (which section may be V-shaped or U-shaped) with its web facing upstream relative to the gas flow direction, a ventilation tube 81, a tubular fuel injector 82, and a heat shield 83 in the form of a curved metal sheet having its concave side facing downstream.

The flame-holder device 8 also has an adapter part 84 (FIG. 3) comprising a base or plate 840 from which there extend two fastener legs 841 and 842, a first fastener support 843 for fastening the external portion of the burner ring 6 extending between the two legs 841 and 842 level with their central branches, and a guide element 844 having two holes 8440 and 8441 through which there pass respectively the fuel injector 82 and the ventilation tube 81 that are mounted on the legs 841 and 842, the guide element 844 also having a second fastener support 845 for fastening the internal portion of the burner ring and including a hole 8442 through which fastener means (not shown in FIG. 2) pass for fastening the internal portion of the burner ring 6.

The adapter part 84 serves to position and fasten the arms in the flow passage, the base 840 being fastened to the internal wall of the external casing 2 (FIG. 1), while the arm 80 is fastened to the legs 841 and 842 by fastener members of the rivet or bolt type, via fastener holes 8410 and 8420 present in the fastener tabs and the holes 801 present in the arm 80.

In addition to positioning and holding the arm 80, the adapter part 84 performs several other functions, namely:
  taking off static pressure from the secondary air stream via the two legs 841 and 842, each of which has its inside constituted by a hollow cavity 841a and 842a that leads into a top cavity 840a formed in the base 840, a takeoff orifice 8410, 8420 being pierced in the bottom portion of each of the legs 841 and 842 in order to feed the cavity 840a with air;
  fastening the burner ring via the first and second fastener supports 843 and 845; and
  guiding the ventilation tube by means of the guide element 844.

Nevertheless, performing all of those functions requires an adapter part that is complex in shape and expensive to make.

Furthermore, the positioning and fastening of the arm by means of the adapter part is not industrial in that it requires each of the parts produced to be matched and fitted.

Finally, another drawback is that at least the plate, the fastener tabs, and the first fastener support for the burner ring are formed integrally in the same piece of metal material obtained by casting, for example. Since the adapter part extends close to a source of heat at high temperature (hot stream), it also needs to be made out of a metal material that withstands high temperatures, and that is therefore expensive.

OBJECT AND SUMMARY OF THE INVENTION

An object of the present invention is to remedy the drawbacks of the prior art by providing a flame-holder device for a reheat channel of a turbojet, the device comprising an arm in the form of a trough defining a cavity and a heat shield fastened in the cavity of the arm, the device being characterized in that it further comprises a fastener plate comprising a first leg integrally formed with the fastener plate and a second leg removably mounted on said plate, the arm being fastened to the first and second legs via fastener members.

In the flame-holder device of the invention, the arm is positioned and fastened by a part that presents a shape that is significantly simplified compared with the prior art adapter part. The fastener plate of the device of the invention has only one leg integrally formed therewith, this first leg serving to take up most of the forces exerted by the flow on the arm.

Furthermore, since the second leg is removably mounted on the fastener plate, it is possible to adjust its position on the plate in order to accommodate possible variations in the shape of the arm. No accommodation machining is therefore needed for the fastener plate, even in the event of moderate variations in the shape and/or the dimensions of the arm. The cost of fabricating the fastener plate of the invention is consequently reduced.

In a first aspect of the flame-holder device of the invention, the first and second legs are solid, the device further comprising a hollow part for static pressure takeoff that is fastened to the fastener plate. Removing the function of taking off static pressure to an element that is external from the plate serves to further simplify making the plate, since there is no longer any need to form an internal cavity in the arms of the plate. Since the hollow part serves only to take static pressure off from the secondary stream, it may be very simple in design, thus making it inexpensive to fabricate.

In a second aspect of the flame-holder device of the invention, it further comprises a burner ring support fastened to the internal portions of the first and second legs. Once more, the function of supporting the burner ring that used to be performed by the adapter plate in the prior art flame-holder device is now performed in the device of the invention by a part that is external to the plate so as to simplify and reduce the cost of fabricating the flame-holder device of the invention. The burner ring support has two fastener tabs.

In a third aspect of the flame-holder device of the invention, the burner ring support is constituted by a piece of sheet metal, thus making it possible to make the ring support from a material that is inexpensive and easy to work. Specifically, the burner ring support may be made out of sheet metal with a limited number of folds, thereby further reducing its cost of fabrication.

In a fourth aspect of the flame-holder device of the invention, the plate presents a housing forming a recess under the surface of said plate, the fastener base of the second leg being held in said housing. It is thus possible to fit the second arm to the plate without disturbing the flow, the fastener base of the second leg being masked in the housing formed in the surface of the plate.

In a fifth aspect of the flame-holder device of the invention, the fastener plate is made of titanium, which is suitable for withstanding the temperatures that are encountered by the fastener plate. Titanium is a material that is less expensive than other metal materials that can withstand high temperatures. The use of titanium is made possible since the fastener plate for the flame-holder device of the invention is to be present only in the secondary stream, and at a significant distance from the primary stream (hot stream). Titanium cannot be used for fabricating the prior art adapter part since a portion of that part is very close to the primary stream.

In a sixth aspect of the flame-holder device of the invention, it further comprises a stiffener extending between the surface of the fastener plate and the first leg so as to reinforce the ability of the leg to withstand the forces generated by the flow.

The present invention also provides a turbojet reheat channel including at least one flame-holder device of the invention.

The invention also provides a turbojet including a reheat channel of the invention.

BRIEF DESCRIPTION OF THE DRAWINGS

Other characteristics and advantages of the present invention appear from the following description given with reference to the accompanying drawings, which show an embodiment having no limiting character. In the figures:

FIG. 1 is a section view of an after-body of a bypass turbojet with an afterburner;

FIG. 2 is a half-section in perspective of a prior art flame-holder device;

FIG. 3 is a perspective view of an adapter part of the FIG. 2 flame-holder device;

DETAILED DESCRIPTION OF THE INVENTION

Figure 4:
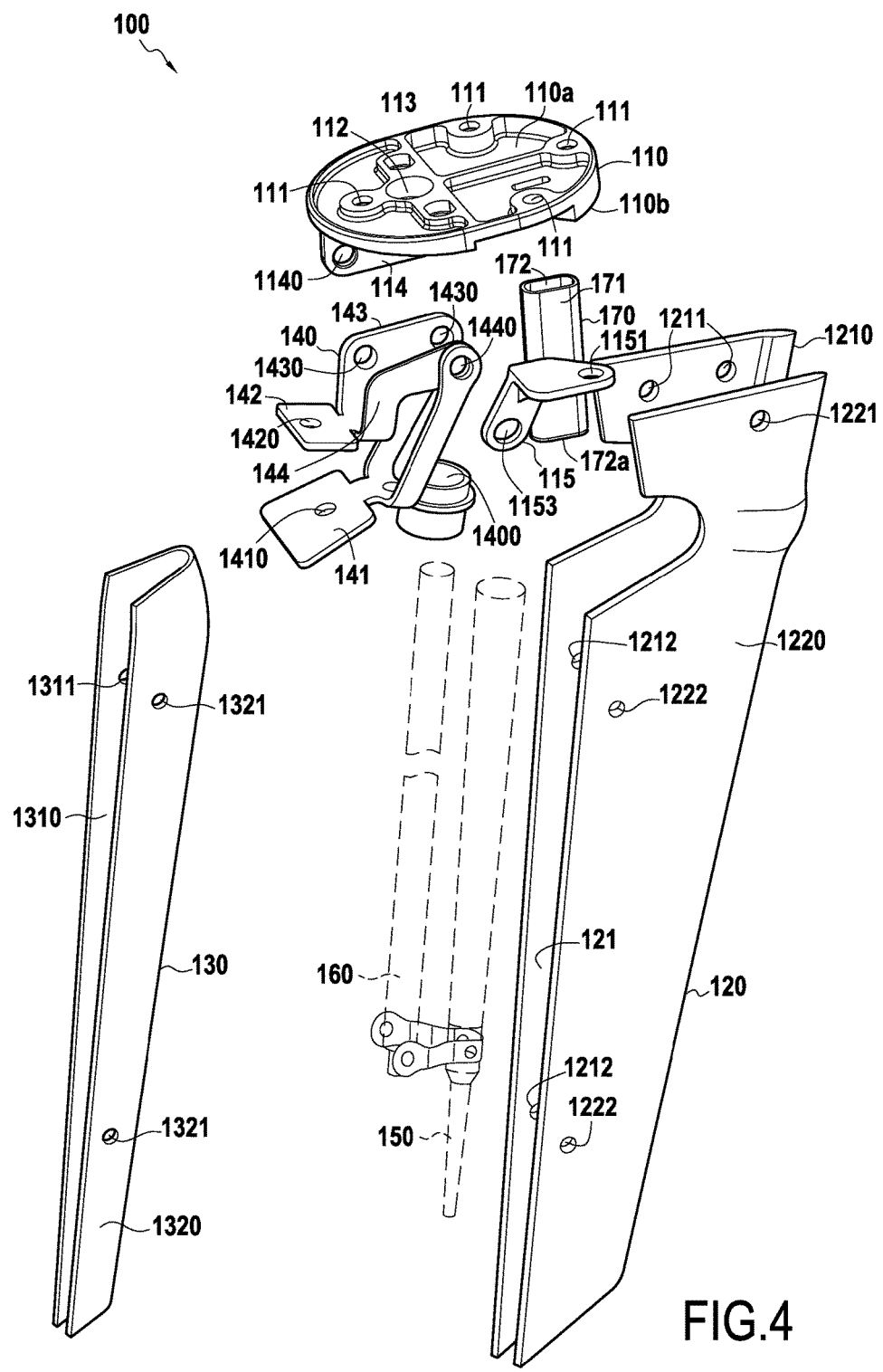
FIG. 4 is an exploded perspective view of a flame-holder device in accordance with an embodiment of the invention.

FIGS. 4 to 7 show the elements of a flame-holder device 100 in accordance with an embodiment of the invention. As shown in FIG. 4, the flame-holder device 100 comprises a fastener plate 110, an arm 120 in the form of a trough defining a cavity 121, a heat shield 130 for fastening in the cavity 121 of the arm 120, a burner ring fastener support 140, a ventilation tube 150, a tubular fuel injector 160, and a hollow pressure-takeoff part 170.

The fastener plate 110 is for fastening to the internal wall of an external annular after-body casing of an afterburner bypass turbojet such as the external casing 2 of the FIG. 1 turbojet, by means of four nut-and-bolt assemblies (not shown in FIG. 4) passing through bores 111 formed in the plate 110. The plate 110 also has a hole 112 for passing the fuel injector 160 and two recesses 133 formed in its internal face 110a for receiving the head of flathead bolts (not shown in FIG. 4) for fastening the head of the fuel injection tube.

Figure 5:
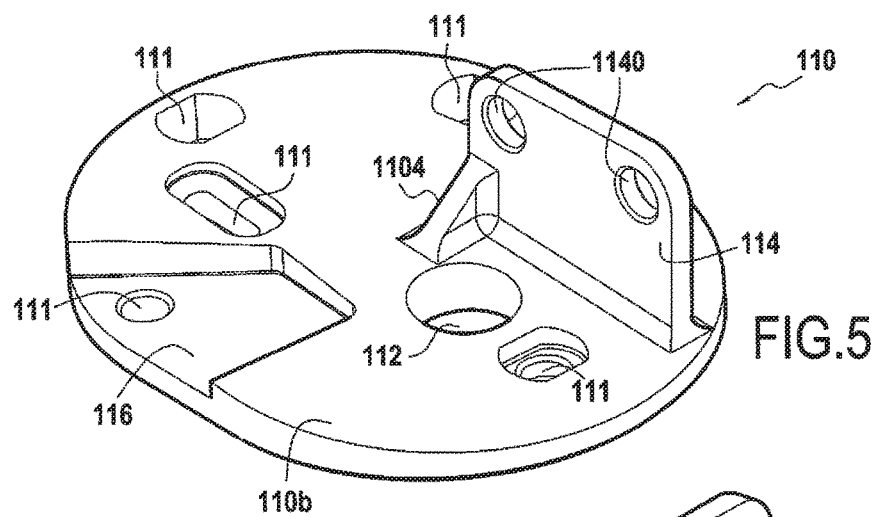
FIG. 5 is a perspective view showing the external face of the adapter plate of the FIG. 4 flame-holder device.
Figure 6:
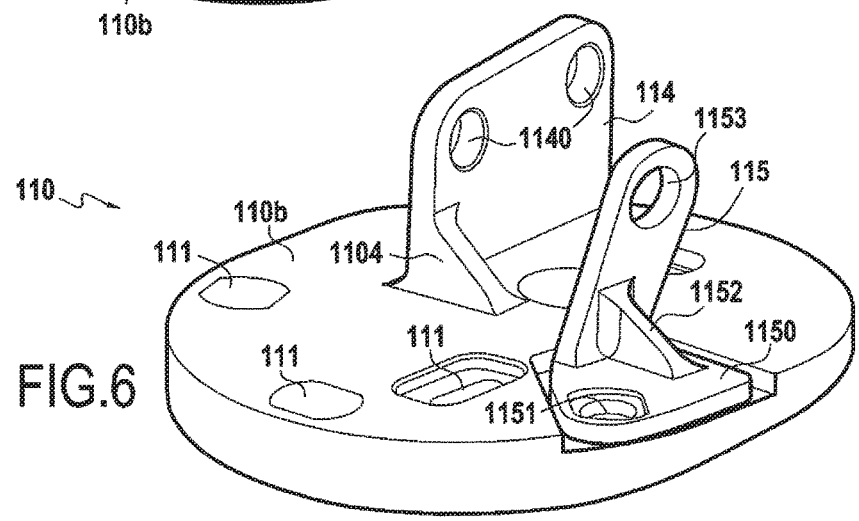
FIG. 6 is a perspective view showing the external face of the adapter plate of the FIG. 4 flame-holder device with the second leg positioned thereon.

The fastener plate 110, which is made of metal material, e.g. of titanium, has a first leg 114 integrally formed therewith and that extends from the external face 110b of the plate (FIGS. 5 and 6). The plate 110 also has a second leg 115 that is fitted thereto in releasable and adjustable manner.

In the presently-described embodiment, a housing 116 set back in the external face 110b of the plate 110 receives the fastener base 1150 of the second leg 115. The removable second leg 115 can thus be mounted on the plate 110 without disturbing the flow. The base 1150 includes a bore 1151 for passing one of the bolts for fastening the plate to the external casing, the bolt also serving to fasten the second leg 115 to the plate 110. The bore 1151 is dimensioned so as to leave clearance relative to the bolt passing through it. This clearance serves to enable the position in which the second leg 115 is fastened on the plate 110 to be adjusted in order to accommodate possible variations in the shape of the arm 120. As a result, no accommodation machining is needed for the fastener plate 110, even in the event of moderate variations in the shape and/or dimensions of the arm 120.

In the presently-described embodiment, the removable leg 115 also includes a stiffener 1152. The first leg 114 in this example also includes a stiffener 1104 extending from the external surface 110b of the plate 110.

The arm 120 is preferably made of a ceramic matrix composite (CMC) material, i.e. a thermostructural composite material comprising reinforcement made of refractory fibers, such as carbon fibers or silicon carbide (SiC) fibers, densified with a matrix that is ceramic at least in part, such as an SiC matrix. Examples of CMC materials are C/SiC composites (carbon fiber reinforcement and silicon carbide matrix), C/C-SiC composites (carbon fiber reinforcement and a matrix comprising both a carbon phase, generally closer to the fibers, and also a silicon carbide phase), SiC/SiC composites (reinforcing fibers and matrix both made of silicon carbide), and oxide/oxide composites (reinforcing fibers and matrix both made of alumina).

The arm 120 is fastened to the external portion of the first leg 114 at two points by fastener members (not shown in FIG. 4) of the nut-and-bolt or rivet type passing through bores 1211 and 1140 present respectively in the wall 1210 of the arm 120 and the first leg 114. The arm 120 is also fastened to the external portion of the second removable arm 115 at one point by a fastener member (not shown in FIG. 4) of the nut-and-bolt or rivet type passing through a bore 1221 formed in the wall 1220 of the arm 120 and a bore 1153 formed in the second leg 115.

The heat shield 130 is also preferably made out of CMC composite material. It is fastened in the cavity 121 of the arm 120 by four fastener members (not shown in FIG. 4) of the nut-and-bolt or rivet type passing through bores 1212 and 1222 formed respectively in the walls 1210 and 1220 of the arm 120 and through bores 1311 and 1321 formed respectively in the walls 1310 and 1320 of the heat shield 130 (FIG. 4).

The fastener support 140 for the burner ring is made of metal material. In the presently-described embodiment, the support 140 is made of folded and welded metal sheet. The support 140 comprises two fastener tabs 141 and 142 that are for fastening respectively to the internal portion and to the external portion of the burner ring, each fastener tab 141 and 142 including a respective bore 1410, 1420 for passing a bolt-type fastener member. The support 140 also includes a hole 1400 for passing and holding the ventilation tube 150. The fastener support 140 for the burner ring is fastened to the internal portion of the first leg 114 at two points by fastener members (not shown in FIG. 4) passing through bores 1430 and 1440 present respectively in the branch 143 of the support 140 and in the first leg 114. The support 140 is also fastened to the internal portion of the removable second arm 115 at one point by the fastener member (not shown in FIG. 4) passing through a bore 1440 formed in the branch 144 of the support 140 and the bore 1153 formed in the second leg 115.

Figure 7:
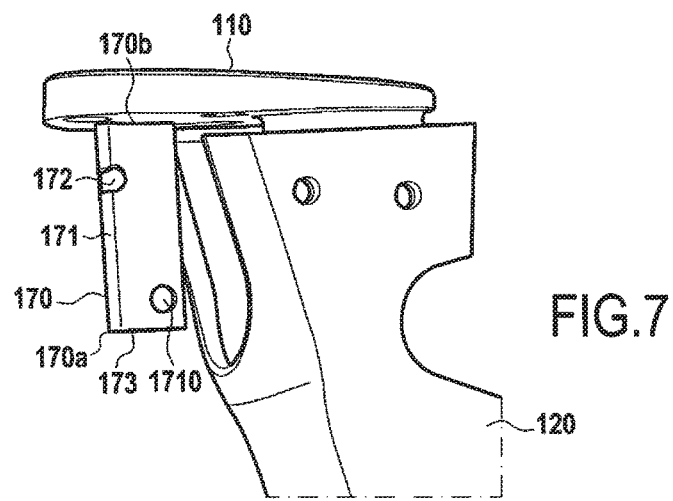
FIG. 7 is a fragmentary perspective view showing the mounting of the hollow part for taking static pressure in the FIG. 4 flame-holder device.

The hollow pressure-takeoff part 170 is made of metal material. In the presently-described embodiment, the part 170 includes an enclosure 171 presenting a section of oblong shape and defining an internal cavity 172 (FIGS. 4 and 7). The internal cavity 172 is closed by an end wall 173 fastened level with the bottom end 170a of the part 170, the cavity 172 being open level with the top end 170b of the part 170. The part 170 also includes an orifice 1710 in the vicinity of its bottom end. The part 170 is for enabling the static pressure in the secondary air stream to be taken off, which was previously done via the cavities in the legs, as described above for the legs 841 and 842 of the adapter part 84 of the prior art flame-holder device shown in FIG. 3. The open top end 170b of the part 170 is fastened, e.g. by welding, to the external face 110b of the fastener plate 110 at an oblong orifice 116 corresponding to the shape of the section of the part 170 (FIG. 6). The end 170b is for co-operating with the orifice 116 in order to feed the internal face 11a of the plate with air, which air is taken from the secondary stream via the orifice 1710.

The invention claimed is:

1. A flame-holder device for a reheat channel of a turbojet, the device comprising:
   an arm in the form of a trough defining a cavity and
   a heat shield fastened in the cavity of the arm,
   wherein the device further comprises a fastener plate comprising a first leg integrally formed with the fastener plate and a second leg removably mounted on said plate,
   the second leg comprising:
   a fastener base and a portion extending from the fastener base,
   the fastener base including a first bore for passing a first fastener therethrough for fastening the second leg to the fastener plate,
   the portion including a second bore for passing a second fastener therethrough for fastening the second leg to the arm,
   wherein the first bore is located on a first plane, the second bore is located on a second plane, and wherein the first plane and the second plane are different and not parallel to one another, and
   the arm being fastened to the first and second legs via fastener members.

2. The device according to claim 1, wherein the first and second legs are solid, and wherein said device further comprises a hollow part for static pressure takeoff that is fastened to the fastener plate.

3. The device according to claim 1, further comprising a burner ring support fastened to internal portions of the first and second legs.

4. The device according to claim 3, wherein the burner ring support has two fastener tabs.

5. The device according to claim 3, wherein the burner ring support is constituted by a piece of sheet metal.

6. The device according to claim 1, wherein the fastener plate includes a housing forming a recess under a surface of said plate, and wherein the fastener base of the second leg is held in said housing.

7. The device according to claim 1, wherein the fastener plate is made of titanium.

8. The device according to claim 1, further comprising a stiffener extending between the surface of the fastener plate and the first leg.

9. The turbojet reheat channel including at least one flame-holder device according to claim 1.

10. A turbojet including the turbojet reheat channel according to claim 9.

11. The device according to claim 1, wherein the fastener plate further comprises a plurality of bores therein, wherein one of the bores of the fastener plate is configured for alignment with the bore of the fastener base of the second leg, wherein the one bore of the fastener plate is configured to receive the fastener therethrough such that, in addition to fastening the second leg to the fastener plate, the fastener member is configured to fasten the fastener plate to a casing of the turbojet.

12. The device according to claim 11, wherein remaining bores of the fastener plate are configured to receive fastener assemblies therethrough for fastening the fastener plate to the casing.

13. The device according to claim 1, further comprising a stiffener extending between a surface of the fastener base plate and the second leg.

14. The device according to claim 8, further comprising a stiffener extending between a surface of the fastener base plate and the second leg.

15. A flame-holder device for a reheat channel of a turbojet, the device comprising:
   an arm in the form of a trough defining a cavity and
   a heat shield fastened in the cavity of the arm,
   wherein the device further comprises a fastener plate comprising a first leg integrally formed with the fastener plate and that extends from an external face of said plate, and a second leg releasably and adjustably mounted on said plate without being integrally formed therewith, the second leg having a first bore for alignment with a second bore on said plate, the first and second bores being configured to receive a fastener therein such that the second leg is fastened to said plate, and the arm being fastened to the first and second legs via fastener members, wherein the second bore is located at a recess set back relative to the external face of said plate, and wherein the second leg is configured to be fastened in said recess by the fastener.

16. The device according to claim 15, further comprising a burner ring support fastened to internal portions of the first and second legs.

17. The device according to claim 15, further comprising a stiffener extending between the surface of the fastener plate and the first leg.

18. The device according to claim 17, further comprising a stiffener associated with the second leg.

19. The device according to claim 15, further comprising a stiffener associated with the second leg.

* * * * *